(12) United States Patent
Liu et al.

(10) Patent No.: US 10,891,905 B1
(45) Date of Patent: Jan. 12, 2021

(54) DEVICES, SYSTEMS, AND METHODS FOR IMPROVING HIGH-POWER DRIVERS

(71) Applicant: Facebook Technologies, LLC, Menlo Park, CA (US)

(72) Inventors: Yuming Liu, Mountain View, CA (US); Dong Yang, Milpitas, CA (US); Chao Hu, San Ramon, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/512,332

(22) Filed: Jul. 15, 2019

Related U.S. Application Data

(60) Provisional application No. 62/834,382, filed on Apr. 15, 2019.

(51) Int. Cl.
*G09G 3/34* (2006.01)
*G02B 27/01* (2006.01)
*G02F 1/13357* (2006.01)

(52) U.S. Cl.
CPC ....... *G09G 3/3406* (2013.01); *G02B 27/0172* (2013.01); *G02B 2027/0132* (2013.01); *G02B 2027/0178* (2013.01); *G02F 1/1336* (2013.01)

(58) Field of Classification Search
CPC .............. G09G 3/3406; G02B 27/0172; G02B 2027/0132; G02B 2027/0178; G02F 1/1336
See application file for complete search history.

(56) References Cited

U.S. PATENT DOCUMENTS

| 2017/0135172 A1* | 5/2017 | Patton ................... H05B 45/38 |
| 2017/0219826 A1* | 8/2017 | Haseltine ............. G02B 27/283 |
| 2019/0174589 A1* | 6/2019 | Takacs .................. H05B 45/38 |

OTHER PUBLICATIONS

Wikipedia, "Boost Converter", URL: https://en.wikipedia.org/wiki/Boost_converter, Dec. 15, 2005, pp. 1-6.
Wikipedia, "Microcontroller", URL: https://en.wikipedia.org/wiki/Microcontroller, May 8, 2004, pp. 1-11.
Wikipedia, "Analog-to-digital converter", URL: https://en.wikipedia.org/wiki/Analog-to-digital_converter, Jul. 27, 2004, pp. 1-14.

* cited by examiner

*Primary Examiner* — Charles V Hicks
(74) *Attorney, Agent, or Firm* — FisherBroyles, LLP

(57) ABSTRACT

The disclosed apparatus may include (1) at least one light-emitting device, (2) a boost circuit electrically coupled to the light-emitting device, and (3) a microcontroller that (A) receives, from a visual display system, a control signal indicating one or more points in time that the light-emitting device is to illuminate a portion of a visual display and (B) directs, based at least in part on the control signal, the boost circuit to provide a sufficient amount of power to the light-emitting device to enable the light-emitting device to illuminate the portion of the visual display at the points in time. Various other apparatuses, systems, and methods are also disclosed.

18 Claims, 13 Drawing Sheets

DEVICES, SYSTEMS, AND METHODS FOR IMPROVING HIGH-POWER DRIVERS

CROSS REFERENCE TO RELATED APPLICATION

This application claims the benefit of U.S. Provisional Application No. 62/834,382, filed on Apr. 15, 2019, the disclosure of which is incorporated, in its entirety, by this reference.

BRIEF DESCRIPTION OF DRAWINGS AND APPENDIX

The accompanying Drawings illustrate a number of exemplary embodiments and are parts of the specification. Together with the following description, the Drawings demonstrate and explain various principles of the instant disclosure.

Figure 6:
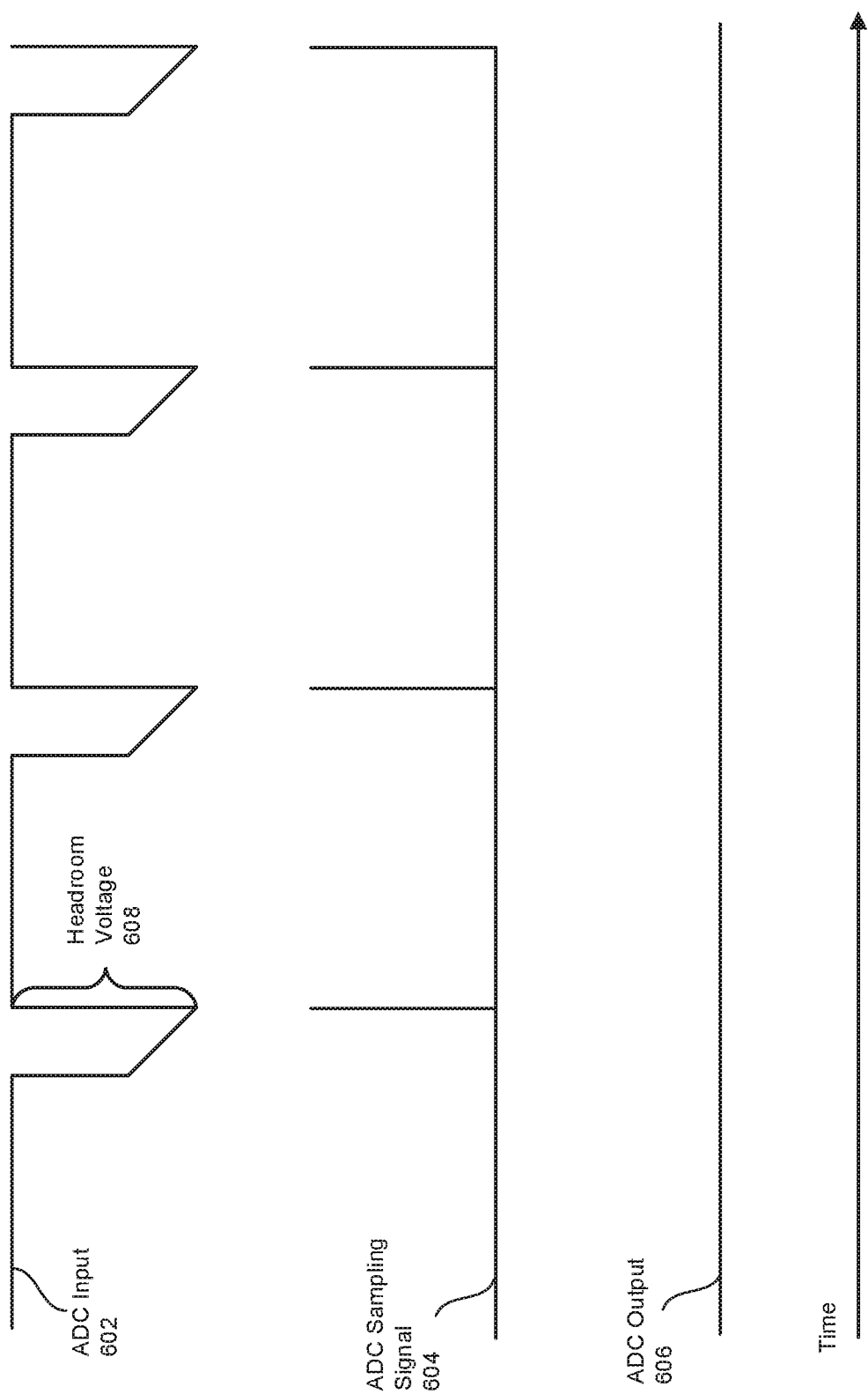

FIG. 6. is an illustration of additional exemplary input and output signals of components of high-power drivers.

Figure 7:
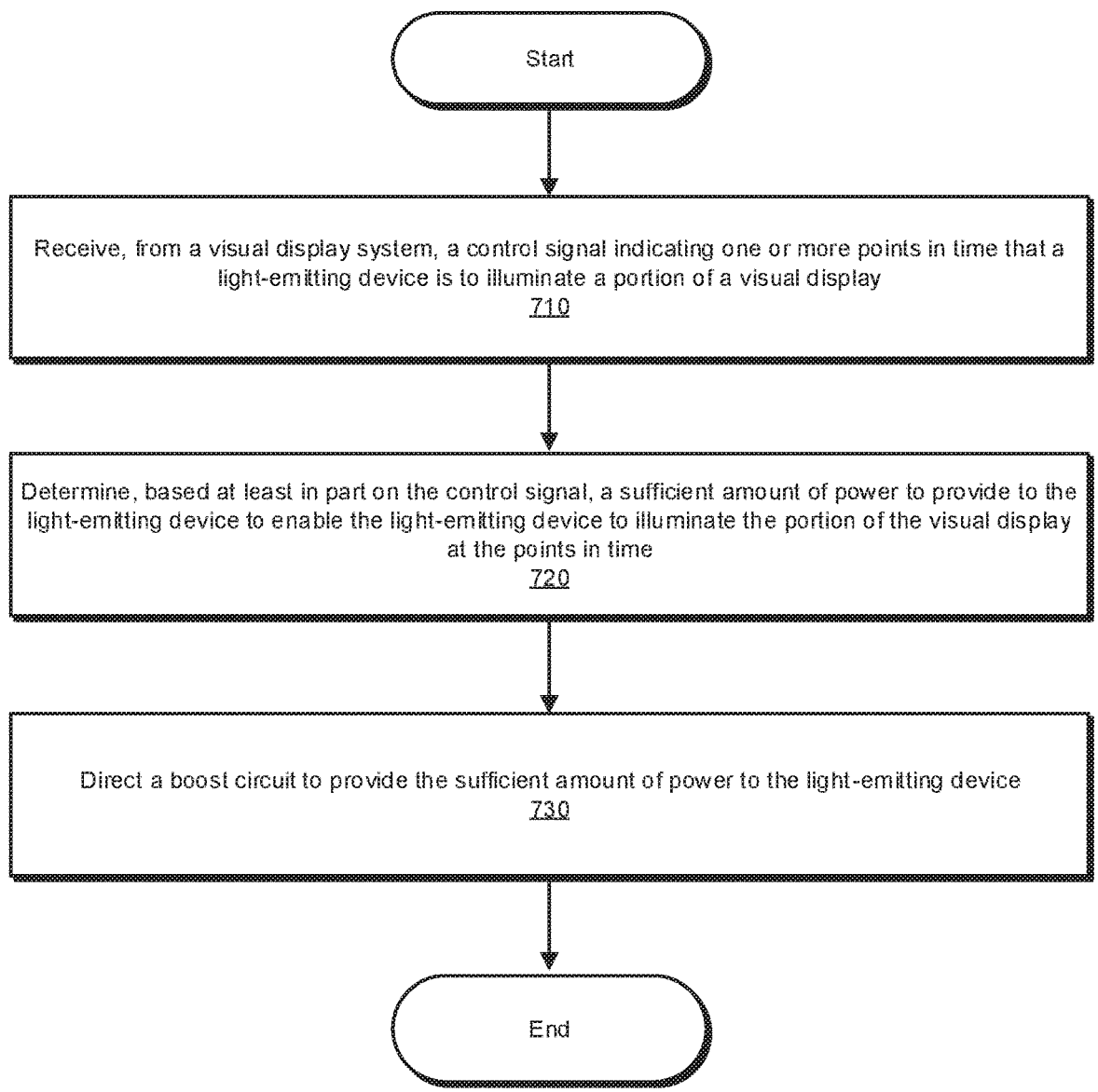

FIG. 7 is a flowchart of an exemplary method for driving high-power loads.

Figure 8:
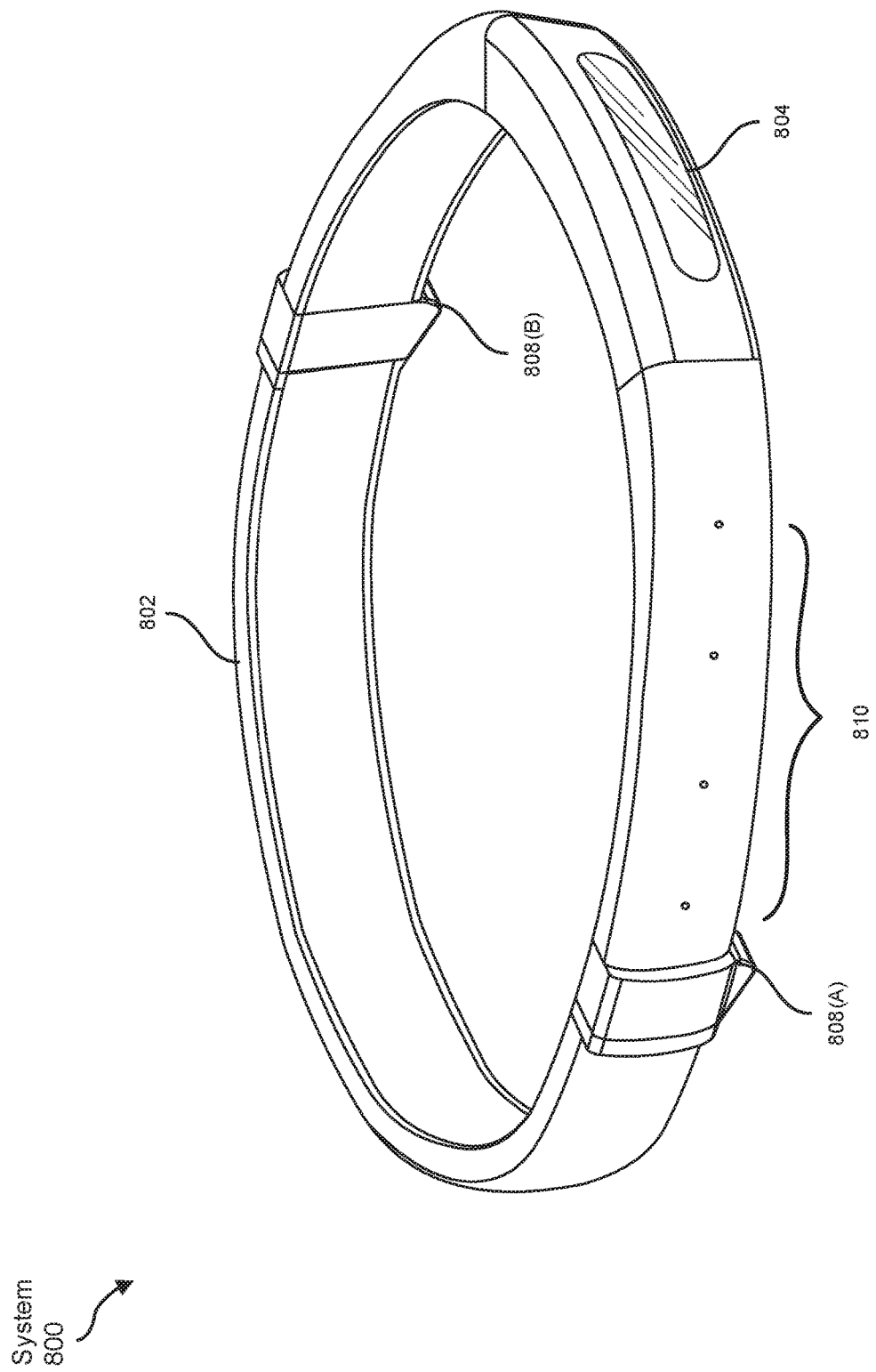

FIG. 8 is an illustration of an exemplary artificial-reality headband that may be used in connection with embodiments of this disclosure.

Figure 9:
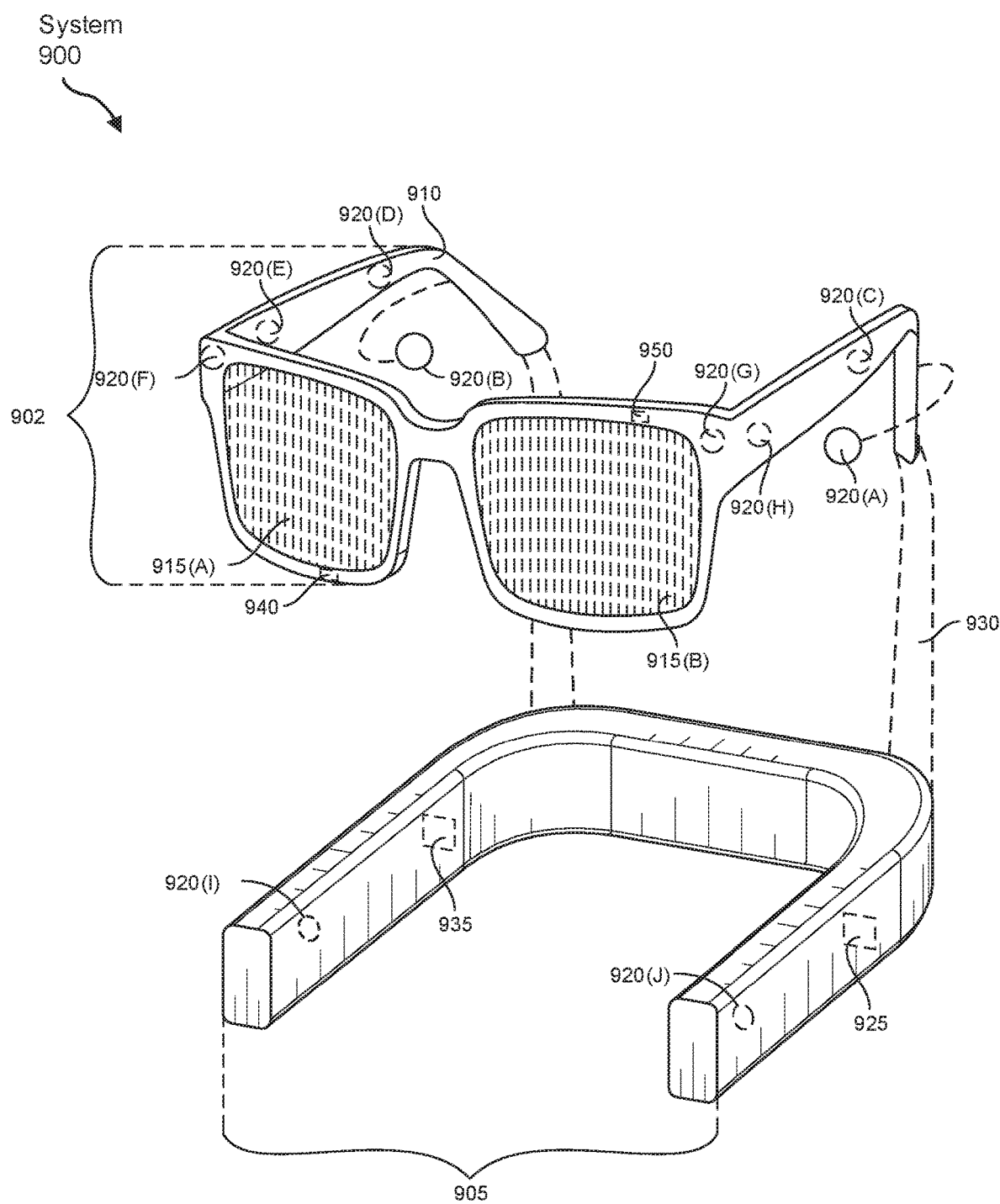

FIG. 9 is an illustration of exemplary augmented-reality glasses that may be used in connection with embodiments of this disclosure.

Figure 10:
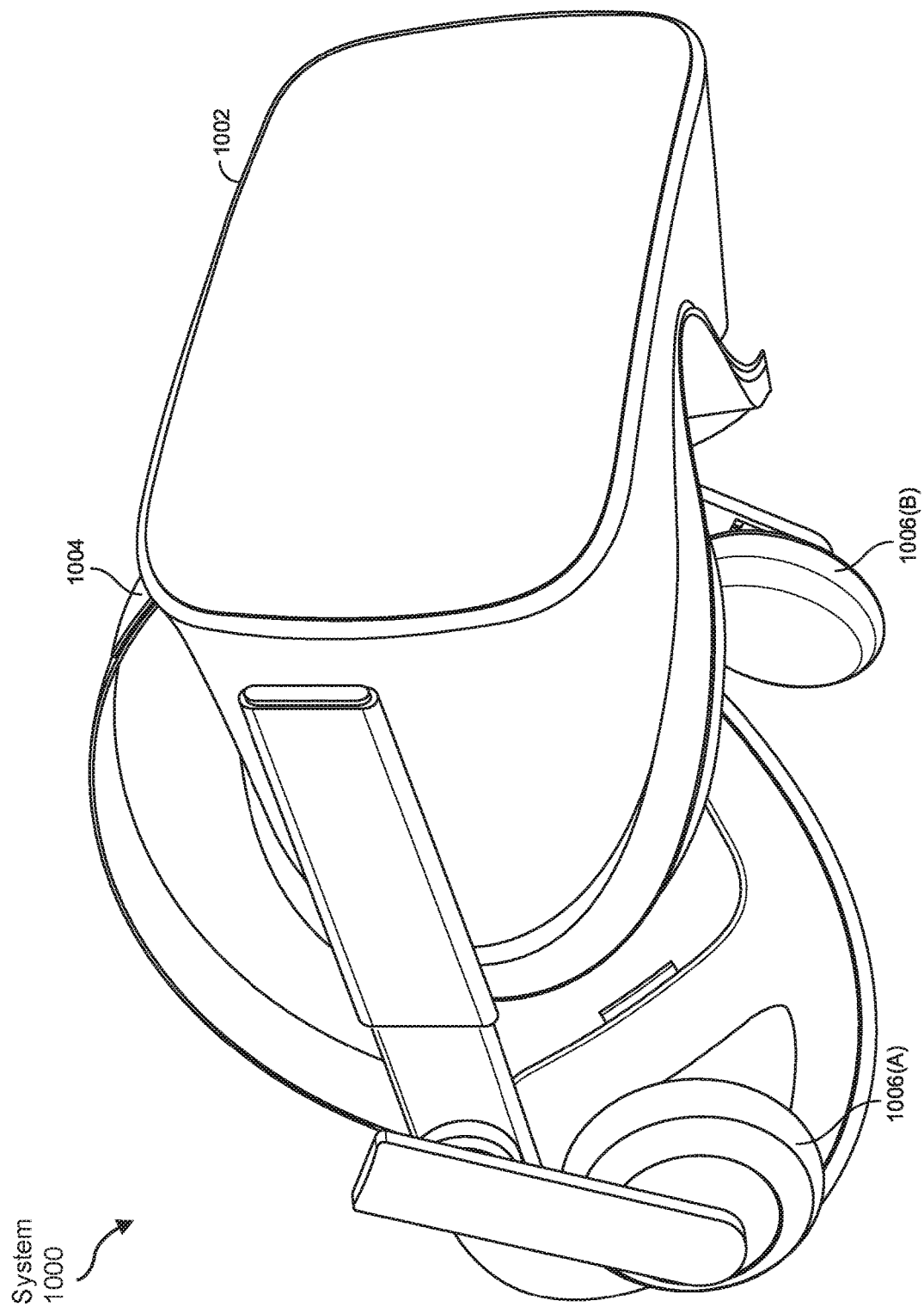

FIG. 10 is an illustration of an exemplary virtual-reality headset that may be used in connection with embodiments of this disclosure.

Figure 11:
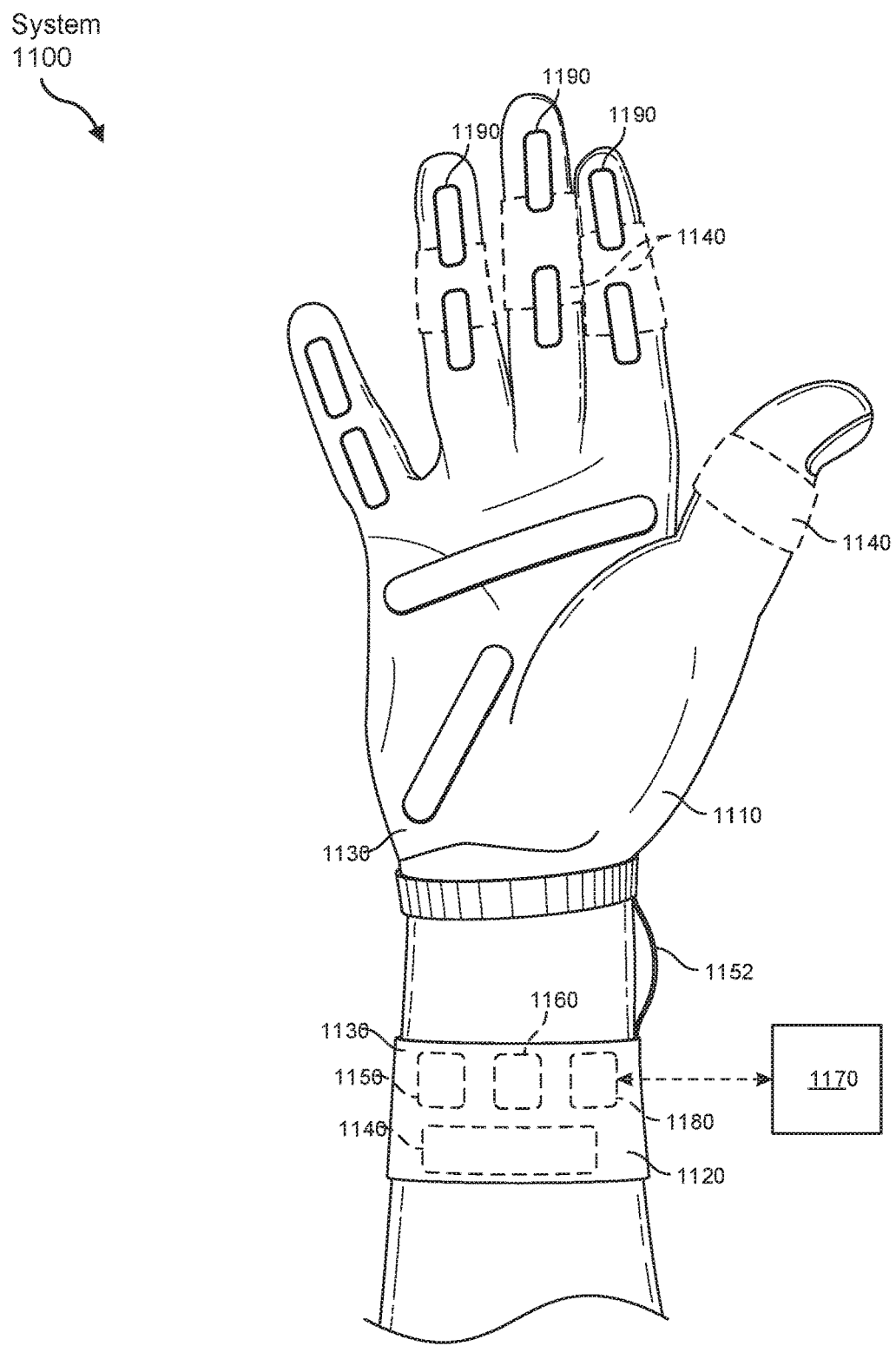

FIG. 11 is an illustration of exemplary haptic devices that may be used in connection with embodiments of this disclosure.

Figure 12:
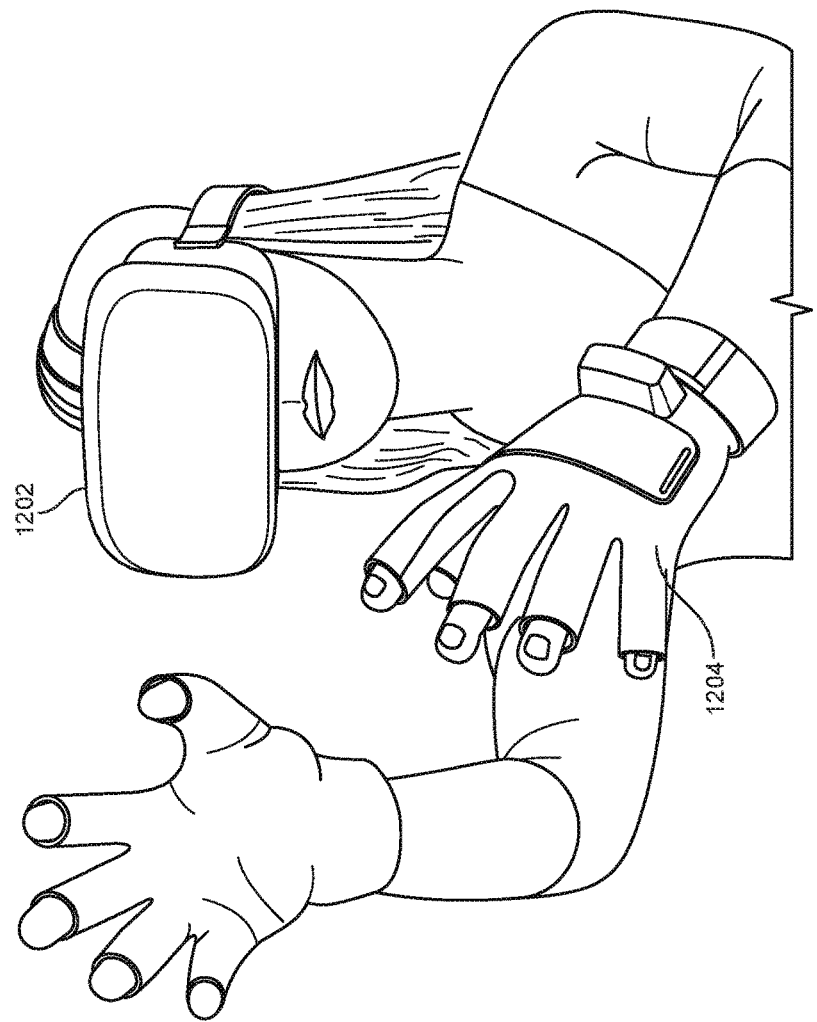

FIG. 12 is an illustration of an exemplary virtual-reality environment according to embodiments of this disclosure.

Figure 13:
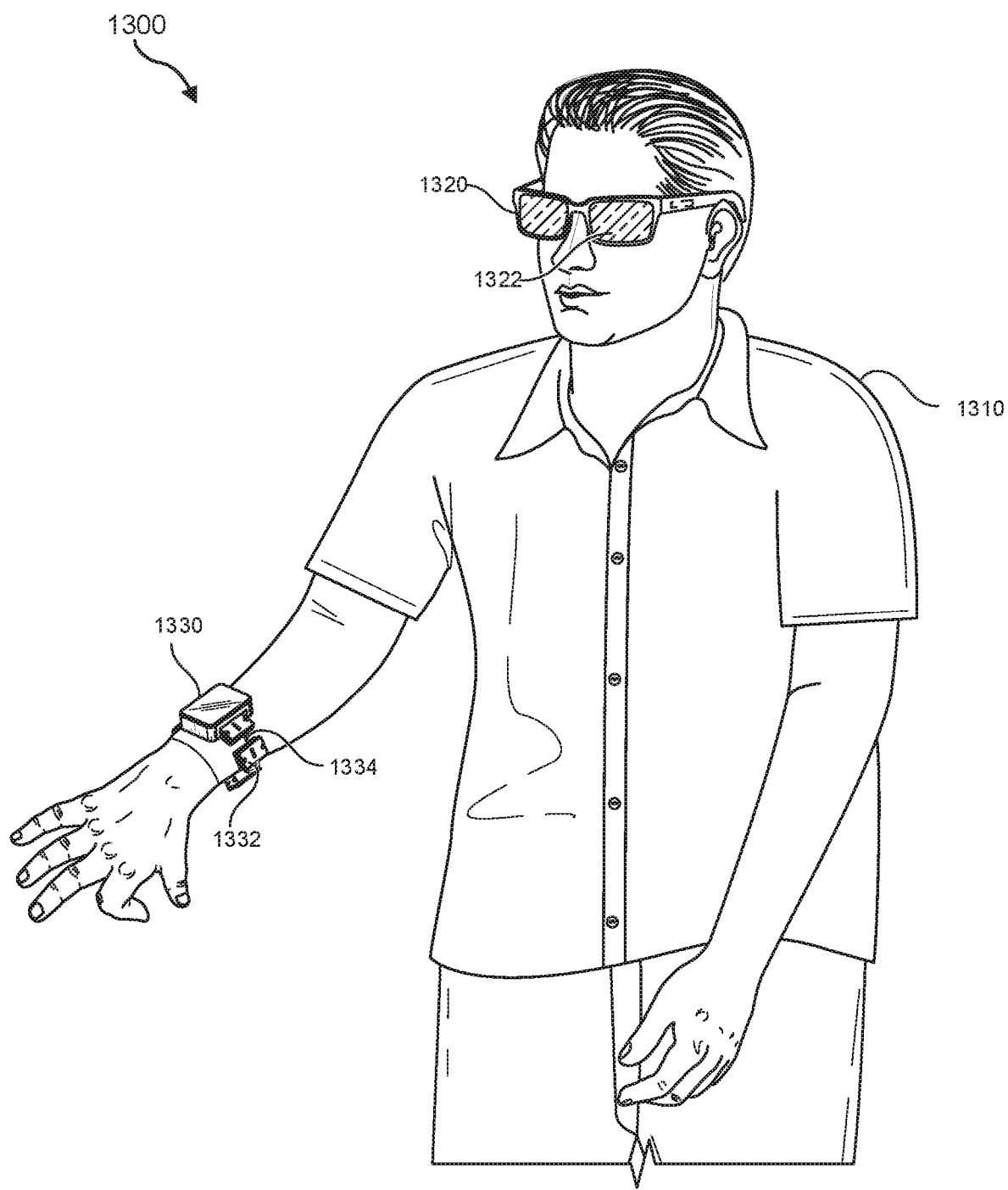

FIG. 13 is an illustration of an exemplary augmented-reality environment according to embodiments of this disclosure.

While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, combinations, equivalents, and alternatives falling within this disclosure.

DETAILED DESCRIPTION OF EXEMPLARY EMBODIMENTS

The present disclosure is generally directed to devices, systems, and methods for improving high-power drivers. As will be explained in greater detail below, these devices, systems, and methods may provide numerous features and benefits.

Many types of visual displays (such as liquid crystal displays (LCDs) and other electronically modulated optical displays) may utilize backlight systems to illuminate content within the displays. For example, an LCD may be equipped with an array of light-emitting diodes (LEDs) or similar devices that, when turned on, enable a user to view the LCD. A visual display system may utilize drivers to provide an appropriate and/or required amount of transient power to these light-emitting devices. For example, a driver may be positioned between a power supply and one or more LEDs that illuminate a display. In this example, the driver may monitor, regulate, and/or adjust the amount of power provided to the LEDs via the power supply to ensure optimal operation of the LEDs.

Some driver systems may provide a combination of alternating current (AC) and direct current (DC) to a load. In some embodiments, supplying a relatively high level of DC input power (relative to the level of AC input power) to a load may provide several advantages and/or benefits. For example, DC input power may minimize power loss between a power source and a load, thereby increasing and/or maximizing the efficiency of the entire system. In addition, DC input power may decrease noise within other systems that receive power from the same power source. Moreover, DC input power may facilitate smoothly discharging some types of power sources (such as batteries), thereby decreasing the burden on the power sources and extending their run time.

Unfortunately, traditional driver systems may provide input power that has relatively large AC components. The current fluctuations within AC input power may result in a large inrush current when an LED is switched on. Inrush currents above a certain threshold may potentially cause malfunctions such as system brown-outs or damage to the LEDs within a backlight. Thus, some traditional driver systems may include capacitors that attempt to smooth and/or control large inrush currents. For example, a conventional driver system may include a first boost stage that stores energy drawn from a power source via one or more capacitors and a second boost stage that supplies pulses of current to a load.

While such two-stage drivers may be sufficient for some applications, these drivers may be unsuitable for and/or incompatible with certain types of visual displays and their accompanying backlight systems. For example, the size of the capacitors implemented within and/or required by a two-stage driver system generally increases with the amount of power provided by the driver system. Recent technological advancements have greatly increased (e.g., doubled) the amount of power utilized by state-of-the-art backlight systems. Thus, implementing conventional two-stage drivers to supply power to these backlight systems may involve and/or require prohibitively large and/or expensive capacitors.

Accordingly, the disclosed driver systems may include various features that facilitate providing high levels of DC current (or approximately DC current) to components of visual display systems. For example, these driver systems may include a single boost stage (rather than two boost stages). In some embodiments, these driver systems may also include a microcontroller unit (MCU) or similar processing device that directs and/or provides input to the boost stage. The MCU may direct the boost stage to provide an appropriate level of DC power to one or more LEDs. For example, the MCU may maintain correct operation of the boost stage by adjusting the pulse width modulation (PWM) of one or more control signals provided to the boost stage. The pulse width of these control signals may correspond to (e.g., be proportional to) the current level output by the boost stage.

In addition, the MCU may monitor and control voltage fluctuations across the LEDs to minimize AC components within the power provided to the LEDs. For example, rather than using such voltage fluctuations as feedback to determine when more power should be supplied to a load (as may be done by traditional driver systems), the disclosed driver systems may filter or remove output voltage fluctuations from a negative feedback loop implemented by the MCU. Reducing voltage fluctuations in this feedback loop may ensure that the input current to the LEDs is purely DC (or almost purely DC). In this way, the driver system may avoid the use of large capacitors whose purpose is to smooth fluctuations in input current.

Figure 1:
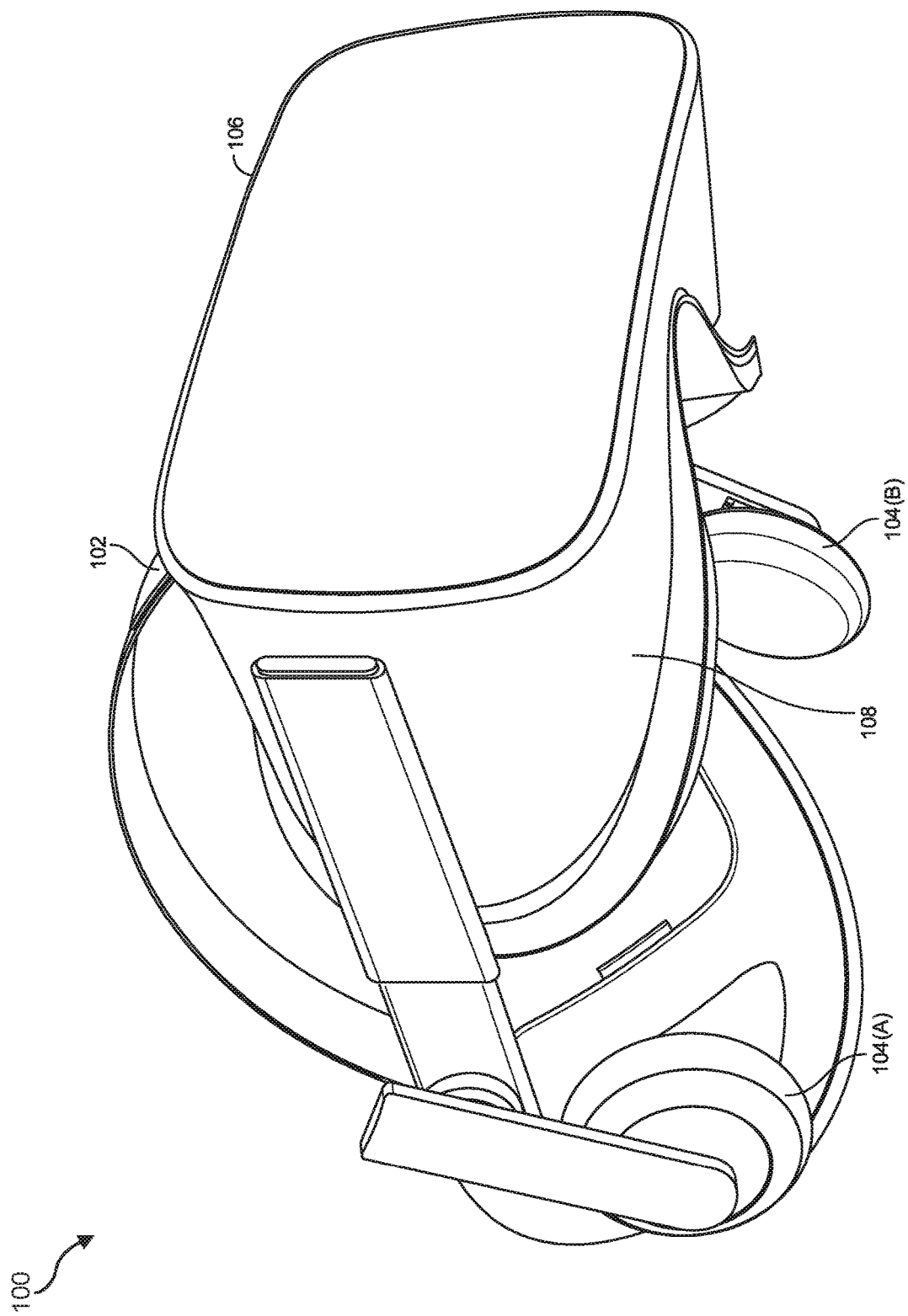
FIG. 1 is an illustration of an exemplary artificial-reality headset that may be used in connection with embodiments of this disclosure.

FIG. 1 illustrates an exemplary wearable device 100 that may include and/or be used in connection with the disclosed driver systems. In some examples, the term "wearable device" may refer to any type or form of computing device that is worn by a user of an artificial reality system and/or visual display system as part of an article of clothing, an accessory, and/or an implant. Examples of wearable devices include, without limitation, headsets, headbands, head-mounted displays, wristbands, gloves, glasses, and/or ankle bands.

In one example, wearable device 100 may represent and/or include a headset that is designed to be worn on a user's face. In this example, wearable device 100 may include a band 102 that is shaped and/or designed to secure wearable device 100 to the user's head. Specifically, band 102 may facilitate securing a housing 108 against the user's face. In addition, wearable device 100 may include one or more output audio transducers, such as output audio transducers 104(A) and 104(B).

As shown in FIG. 1, wearable device 100 may also include a visual display 106 that is incorporated into and/or secured by housing 108. Visual display 106 generally represents and/or includes any type or form of screen, interface, or other optical device that provides visual content (e.g., images, graphics, videos, and the like) to a user. In some examples, the content provided via visual display 106 may facilitate immersing the user in a virtual, artificial, and/or augmented reality experience.

In some embodiments, visual display 106 may represent and/or include a high-resolution and/or low-latency display. These displays may require and/or utilize a high amount of power and/or current (e.g., compared to some traditional types of visual displays). Examples of visual display 106 include, without limitation, an LCD or other electronically modulated display, a plasma display, an electronic paper display, a field-emission display (FED), and the like. Although FIG. 1 illustrates visual display 106 incorporated into a headset, visual display 106 may be incorporated into mobile devices, laptops, televisions, monitors, gaming systems, and/or any additional type of device that provides visual content to users.

In some examples, visual display 106 may include and/or operate in conjunction with a backlight system. This backlight system may illuminate all or a portion of visual display 106 such that the content provided on visual display 106 is visible to the user. The backlight system may include any number or type of light-emitting devices. In the example of FIG. 1, the backlight system may include an array of LEDs (not visible in FIG. 1) that is positioned behind and/or adjacent to visual display 106. The disclosed driver systems may provide power to all or a portion of the components of visual display 106 and/or its backlight system.

Figure 2:
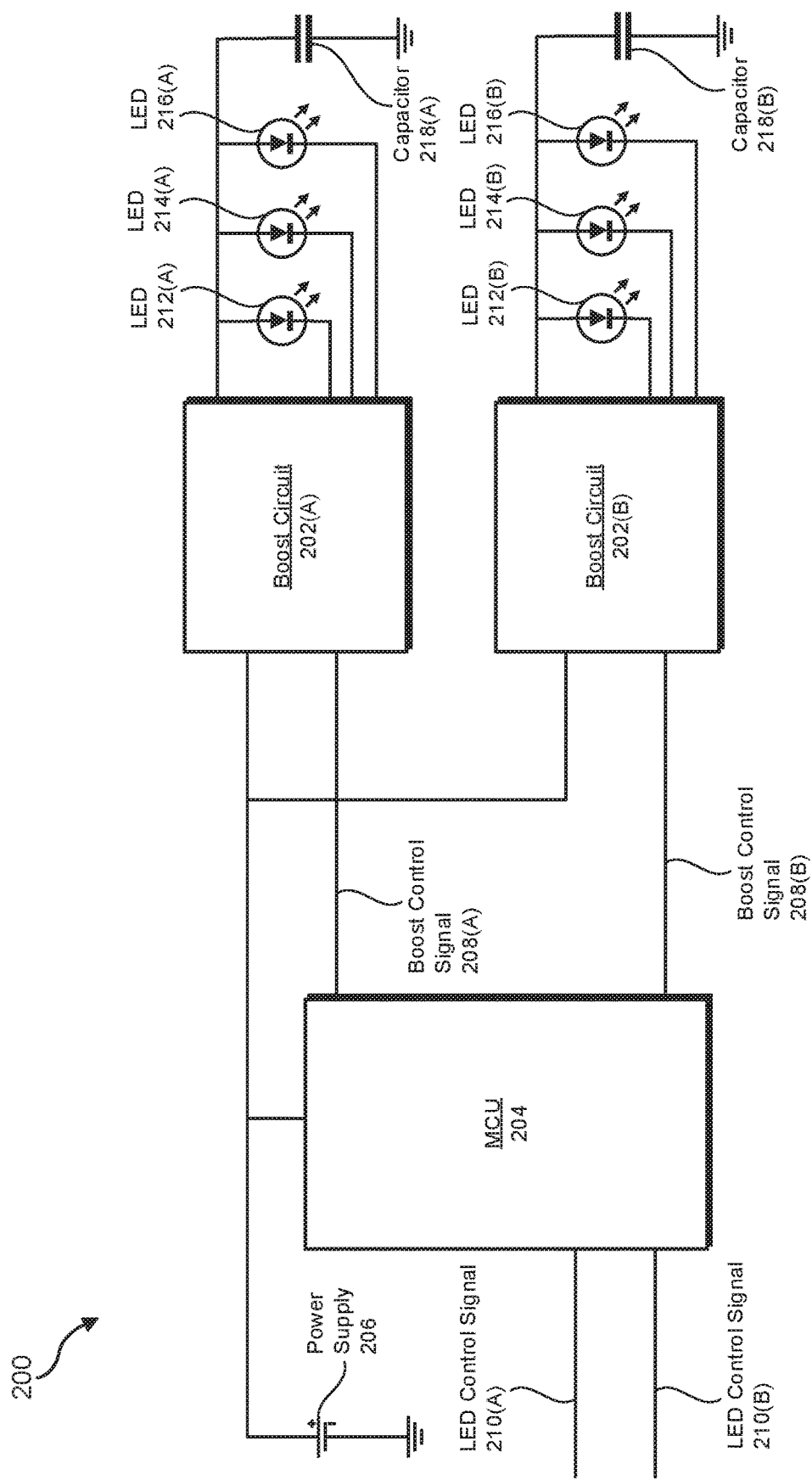
FIG. 2 is a diagram of an exemplary apparatus for driving high-power loads.

FIG. 2 illustrates an exemplary apparatus 200 that may be incorporated into a visual display system. Specifically, apparatus 200 may represent a driver that provides power to one or more light-emitting devices of a backlight system that illuminates visual display 106. As shown in FIG. 2, apparatus 200 may include a boost circuit 202(A) and a boost circuit 202(B). Boost circuits 202(A) and 202(B) generally represent any type or combination of electrical components that output a certain and/or controlled amount of power, voltage, and/or current to one or more loads. In the example of FIG. 2, boost circuits 202(A) and 202(B) may boost, amplify, and/or otherwise alter power drawn from a power supply 206. Boost circuits 202(A) and 202(B) may then provide this power to one or more of LEDs 212(A), 212(B), 214(A), 214(B), 216(A) and/or 216(B). Power supply 206 may represent and/or include any suitable type of power supply, such as a battery, a direct current (DC) power supply, and/or an alternating current (AC) power supply.

In some embodiments, apparatus 200 may include an MCU 204 that directs and/or controls boost circuits 202(A) and/or 202(B). For example, MCU 204 may control the amount of power output by boost circuits 202(A) and/or 202(B). In this way, MCU 204 may ensure that the LEDs coupled to boost circuits 202(A) and/or 202(B) receive an appropriate amount and/or type of power. For example, MCU 204 may ensure that the LEDs receive an optimal and/or sufficient amount of average power while the user is interacting with visual display 106. Specifically, MCU 204 may ensure that the voltage and/or current levels of power input to the LEDs are at a certain level or within a certain range. Additionally or alternatively, MCU 204 may ensure that the DC and AC components of the input power are within a certain range or ratio relative to each other. For example, MCU 204 may help ensure that the DC component of the input power is at least a certain percentage (e.g., 90%, 95%, etc.) of the total input power.

As shown in FIG. 2, MCU 204 may control the output of boost circuit 202(A) via a control signal 208(A). Similarly, MCU 204 may control the output of boost circuit 202(B) via a control signal 208(B). These control signals may direct the operation of boost circuits 202(A) and 202(B) in various ways. In one example, a control signal sent by MCU 204 may be a pulse wave with a variable pulse width and/or frequency. In this example, the PWM of the control signal may correspond to and/or control the output of the boost circuit that receives the control signal. For example, increasing the pulse width (e.g., duty cycle) of control signal 208(A) may increase the amount of power (e.g., the current level) output by boost circuit 202(A). In one embodiment, the current level input to an LED by a boost circuit within apparatus 200 may be defined by the equation $$I = A(f)\frac{V*D}{L},$$

where I is the input current, V is the input voltage, D is the duty cycle of the control signal, L is the inductance of the boost circuit, and A(f) is a constant related to the frequency of the control signal.

MCU 204 may adjust the PWM of control signal 208(A) and/or 208(B) in response to a variety of contexts and/or stimuli. In some examples, MCU 204 may adjust the PWM of the control signals based at least in part on an LED control signal 210(A) and/or an LED control signal 210(B). In one embodiment, LED control signal 210(A) may indicate points in time that LEDs 212(A), 214(A), and 216(A) are turned on. Similarly, LED control signal 210(A) may indicate points in time that LEDs 212(B), 214(B), and 216(B) are turned on. For example, these control signals may indicate when the LEDs are to emit light such that a portion of visual display 106 is visible to the user. In one embodiment, LED control signals 208(A) and 208(B) may be generated by a component of apparatus 200 (such as MCU 204 or boost circuits 202(A) and 202(B)). In other embodiments, LED control signals 208(A) and 208(B) may be generated by an external system (such as an artificial reality system and/or visual display system that manages virtual content displayed on visual display 106). In these embodiments, the external system may simultaneously pass the control signals to the LEDs of apparatus 200 and MCU 204.

Figure 3:
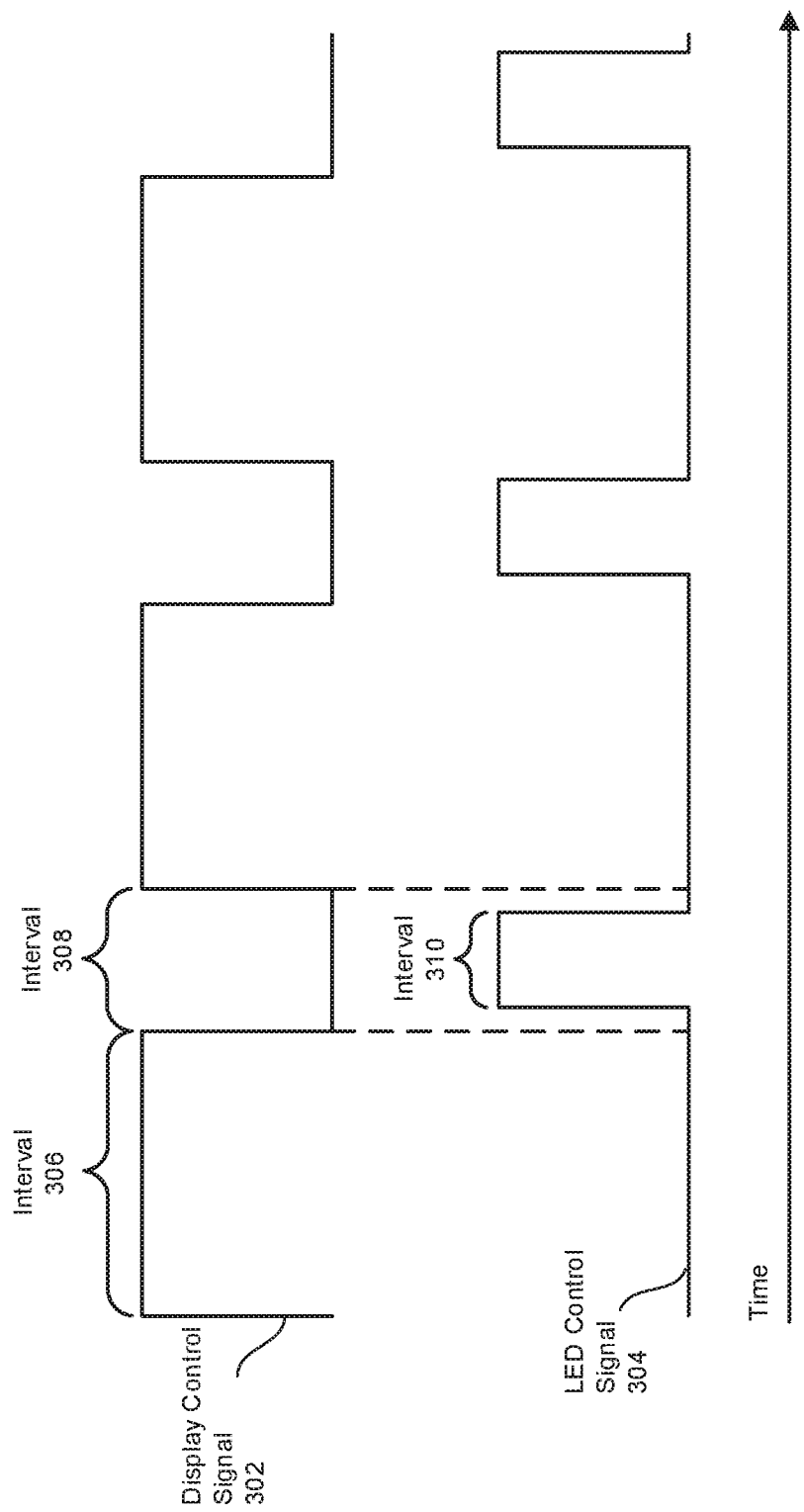
FIG. 3 is an illustration of exemplary controls signals that control components of visual displays.

FIG. 3 illustrates exemplary control signals that may direct the operation of all or a portion of a visual display and/or a backlight system. In this example, a display control signal 302 may indicate and/or control when a portion of visual display 106 refreshes and/or changes content displayed to the user. Specifically, time intervals in which display control signal 302 is high (e.g., an interval 306) may correspond to time intervals in which an artificial reality system is preparing (e.g., writing data to) a group of pixels within visual display 106. Time intervals in which display control signal 302 is low (e.g., an interval 308) may correspond to time intervals in which the pixels are static. When the pixels are static, they may be ready to be illuminated by one or more LEDs such that they are visible to the user.

FIG. 3 also illustrates an LED control signal 304 that corresponds to and/or aligns with display control signal 302. In this example, time intervals in which LED control signal 304 is high (e.g., an interval 310) may correspond to time intervals in which the LEDs are turned on. Time intervals in which LED control signal 304 is low may correspond to time intervals in which the LEDs are turned off. As shown in FIG. 3, interval 310 may be shorter than interval 308. In other words, display control signal 302 and LED control signal 304 may not overlap. Preventing this overlap may prevent and/or reduce defects in visual display 106 (such as so-called ghost images). The duty cycle of LED control signal 304 may be of any suitable value (e.g., 8%, 10%, etc.) to optimize the quality of images presented on visual display 106.

In one example, LED control signal 304 may represent and/or correspond to LED control signal 210(A) in FIG. 2. In this example, the duty cycle and/or frequency of LED control signal 304 may correspond to an amount of power utilized by LEDs 212(A), 214(A), and 216(A). For example, an increase in the length of interval 310 may produce an increase in the average amount of power drawn and/or required by the LEDs. Thus, MCU 204 may increase the duty cycle of control signal 208(A) (and therefore the amount of power provided by boost circuit 202(A)) in response to an increase in the length of interval 310. MCU 204 may implement any type or form of algorithm and/or analysis to appropriately select and/or adjust the duty cycle of control signals 208(A) and 208(B) based on the duty cycle and/or frequency of control signals 210(A) and 210(B).

Boost circuits 202(A) and 202(B) may include any number or type of components that increase, amplify, and/or otherwise alter power provided by power supply 206. For example, boost circuits 202(A) and 202(B) may include a boost converter, an amplifier, a current driver, a feedback loop, a switch, and/or any other electrical element, device, or circuit. In some embodiments, boost circuits 202(A) and 202(B) may be generally similar to one another (e.g., they may contain the same components). In other embodiments, one or more of the components of boost circuits 202(A) and 202(B) may differ (e.g., based on differences in the number and/or type of LEDs powered by the boost circuits). Moreover, apparatus 200 may include any number of additional boost circuits not illustrated in FIG. 2. The boost circuits of apparatus 200 may operate synchronously (e.g., control signal 208(A) may be the same as control signal 208(B)) or independently.

Notably, while apparatus 200 may include multiple boost circuits, apparatus 200 may include only one boost stage. For example, a single boost circuit may reside between power supply 206 and any of the LEDs powered by apparatus 200. In contrast, many traditional driver systems may include two (or more) boost stages. Implementing a driver system with a single boost stage may reduce the number of components incorporated into the system (and therefore reduce the cost and/or size of the system). In addition, and as will be explained in greater detail below, implementing a single boost stage whose output is controlled by an MCU may facilitate providing high levels of constant current and/or average power to backlight systems.

Figure 4:
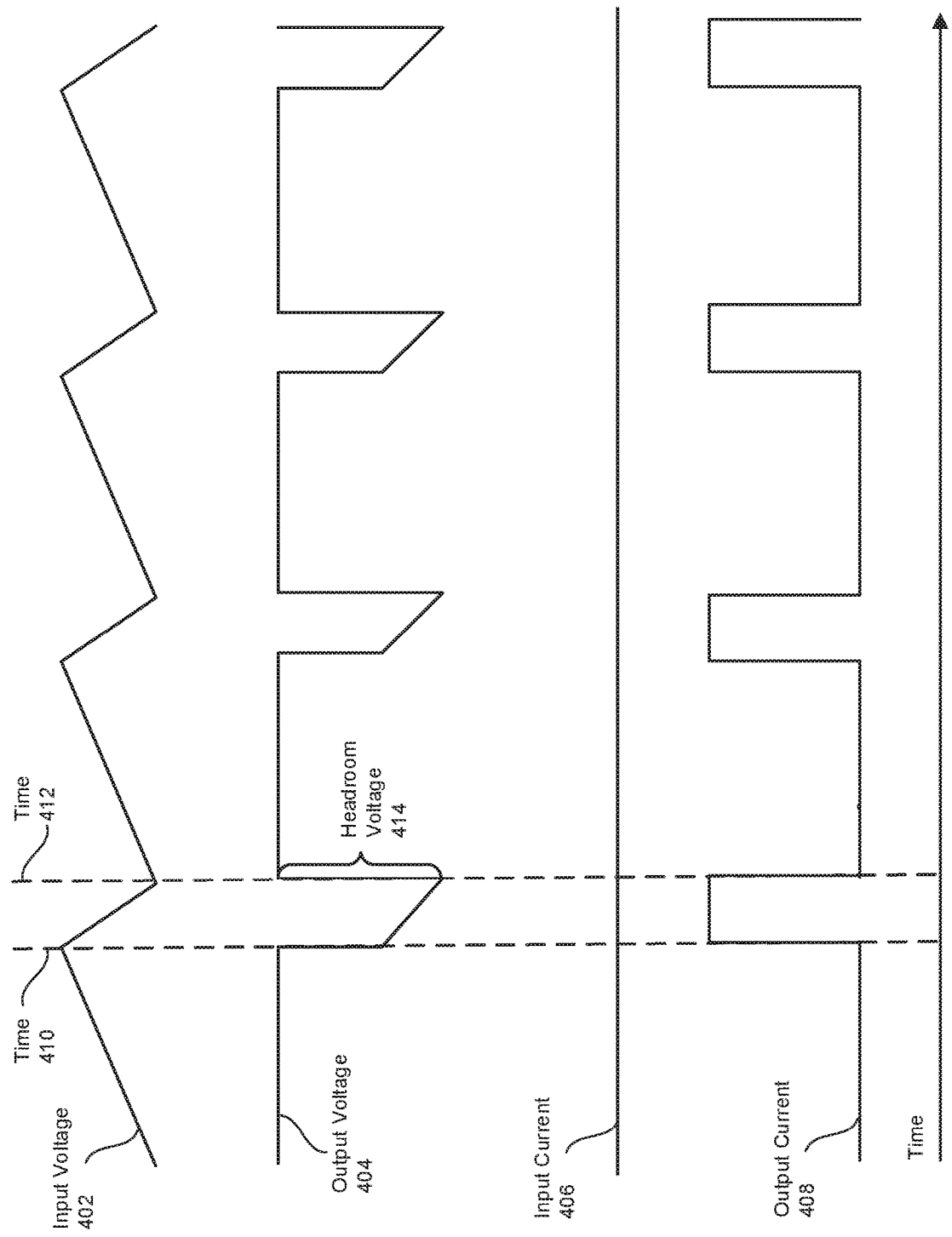
FIG. 4 is an illustration of exemplary input and output signals of components of high-power drivers.

FIG. 4 illustrates exemplary waveforms corresponding to an input voltage 402, an output voltage 404, an input current 406, and an output current 408 of the LEDs of apparatus 200. As shown in FIG. 4, input voltage 402 may be described (or approximately described) by a sawtooth waveform. In this example, the boost circuits of apparatus 200 may periodically or continuously amplify the voltage level (e.g., 2-5 Volts) provided by power supply 206 to a higher voltage level (e.g., 25-30 Volts). This amplification may occur while the LEDs are turned off. When the LEDs are turned on (e.g., at a time 410 illustrated in FIG. 4), input voltage 402 may drop. Input voltage 402 may then begin to rise again when the LEDs are turned back off (e.g., at a time 412 illustrated in FIG. 4).

As shown in FIG. 4, output voltage 404 of the LEDs may remain high while the LEDs are turned off and drop once the LEDs are turned on. This voltage drop across the LEDs may be referred to as a headroom voltage. FIG. 4 illustrates an exemplary headroom voltage 414. In some traditional driver systems, the headroom voltage across the load may be utilized as feedback to a boost circuit and/or current driver. For example, when the output voltage drops, a traditional driver system may increase the amount of power and/or current provided by the boost circuit. Thus, fluctuations in output voltage may generate corresponding fluctuations in input current.

As will be explained in greater detail below, the disclosed driver systems may prevent fluctuations in output voltage from introducing significant and/or undesirable fluctuations (e.g., AC components) into the input current. For example, as illustrated in FIG. 4, input current 406 may be constant (or approximately constant). When the LEDs of apparatus 200 are turned off, this current may be drawn by one or more capacitors connected to the output of boost circuits 202(A) and 202(B) (such as capacitors 218(A) and 218(B) shown in FIG. 2). When the LEDs are turned on, the LEDs may draw a constant current from the capacitors and/or the boost circuits of apparatus 200. Accordingly, output current 408 may be low (e.g., approximately 0 amperes) when the LEDs are turned off and high (e.g., 0.5 amperes, 0.6 amperes, etc.) when the LEDs are turned on.

Providing a constant or approximately constant input current to a load may provide numerous benefits and/or advantages for a driver system. In some embodiments, a constant input current may increase the efficiency of the driver system. For example, current provided to load may include a DC component (e.g., the average current of the signal) and/or an AC component (e.g., AC harmonics). The effective value of the current may correspond to the vector sum of the DC component and the AC component (e.g., the root-mean-square of the two components). In some examples, the DC component of a signal may represent and/or provide active power (e.g., power that is transferred from a power source to a load). In contrast, the AC harmonic components of a signal may represent and/or correspond to reactive power (e.g., power that returns to the power source each cycle). Because reactive power is not utilized by a system (and may also result in increased heat dissipation and/or electromagnetic interference), increasing the amount of DC power (relative to the amount of AC power) provided by a driver may improve the overall performance and efficiency of the driver.

The ratio of active power to the total amount of power provided to a load may be quantified by a metric known as a power factor. The power factor of a signal may be calculated based on the harmonic components of the signal. For example, the power factor may be defined by the ratio $$\frac{I_{DC}}{I_{rms}},$$

where $I_{DC}$ is the DC level of the signal and $I_{rms}$ is the root-mean-square of the DC and AC components of the signal. Because the value of $I_{rms}$ is necessarily equal to or greater than the value of $I_{DC}$, power factor values may range between 0 and 1, with a power factor of 1 corresponding to a signal whose power is 100% active (i.e., purely DC power). In some embodiments, the disclosed driver systems may provide power whose power factor equals or approaches 1. For example, boost circuits 202(A) and/or 202(B) may be designed to provide power with a power factor of at least a certain value (e.g., 0.95).

Furthermore, providing constant or approximately constant input current may reduce the size of the capacitors required and/or utilized by a driver system. For example, one or more capacitors may be implemented within a driver to smooth and/or control the input current provided to a load. The size of a capacitor may be proportional to the peak input current (e.g., in accordance with the equation $$i = C \frac{dv}{dt},$$

where i is in instantaneous current through the capacitor, C is the capacitance of the capacitor, and $$\frac{dv}{dt}$$

is the change in voltage across the capacitor).

Because a traditional two-stage driver may provide AC power to a load, a relatively high peak input current may be required in order to maintain a certain level of average power for the load. Providing DC (or approximately DC) power to a load may enable a lower level of input current to maintain the same level of average power. Thus, when powering a certain backlight system, the disclosed driver systems may utilize smaller capacitors than many traditional two-stage drivers. For example, the capacitance of capacitors 218(A) and 218(B) of apparatus 200 may be significantly lower (e.g., 25% lower, 50% lower, etc.) than the capacitance of capacitors incorporated into traditional two-stage drivers. Moreover, when using capacitors similar to those used in traditional drivers, the disclosed systems may provide significantly higher amounts of power (e.g., twice as much power) to a backlight system.

Figure 5:
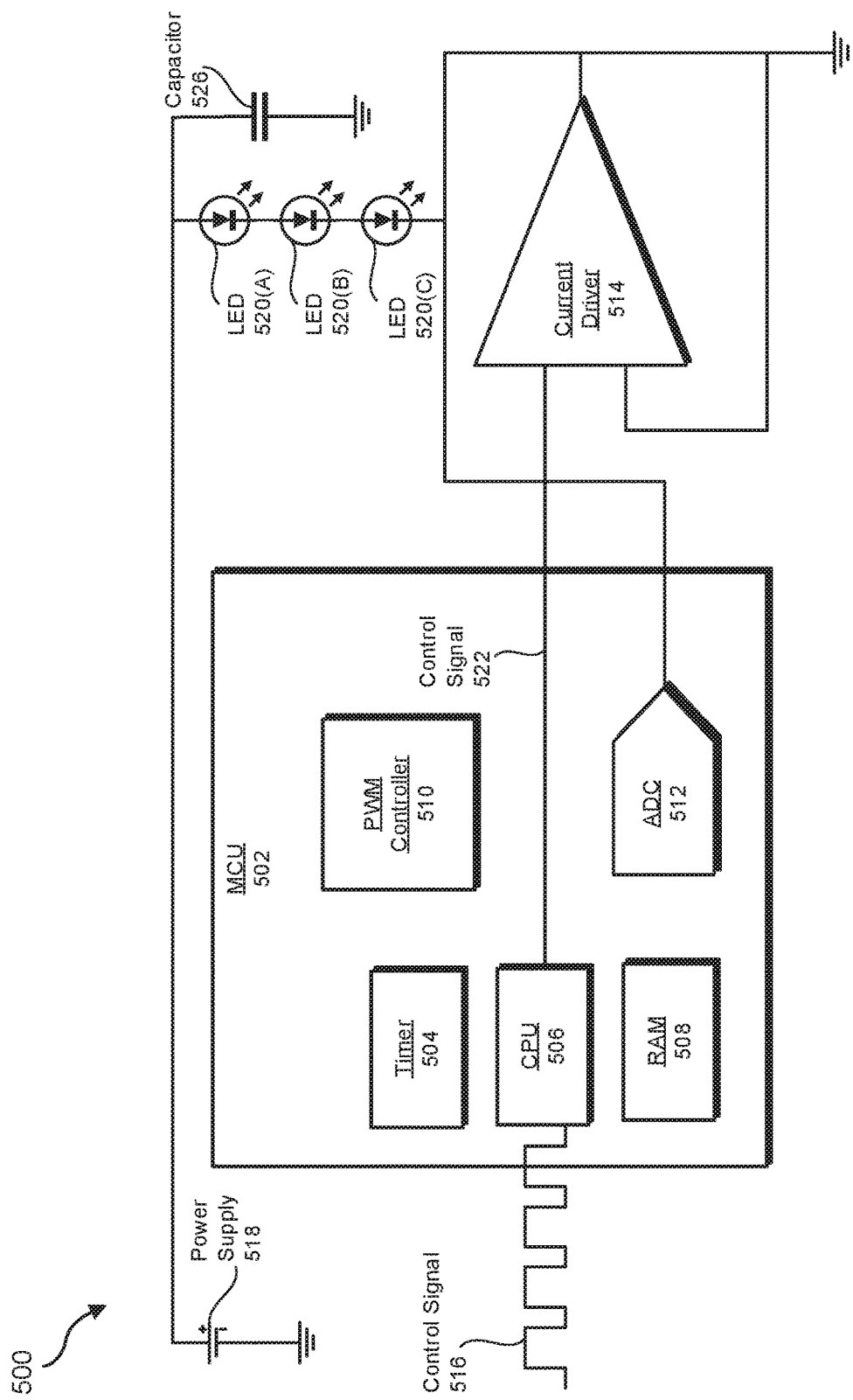
FIG. 5 is a diagram of an additional exemplary apparatus for driving high-power loads.

The disclosed driver systems may include one or more components that facilitate providing constant or approximately constant current to a load. FIG. 5 illustrates an exemplary apparatus 500 that includes such components. As shown in FIG. 5, apparatus 500 may include an MCU 502 and a current driver 514. MCU 502 and/or current driver 514 may facilitate providing constant or approximately constant current to one or more of LEDs 520(A), 520(B), and 520(C). In one example, current driver 514 may provide this current by amplifying, controlling, and/or altering power drawn from a power supply 518.

MCU 502 generally represents any type or form of microcontroller unit, microprocessor, system on a chip (SoC), and/or similar computing device. In one embodiment, MCU 502 may represent and/or include an 8-bit microcontroller with one or more integrated components. As shown in FIG. 5, MCU 502 may include a timer 504 that provides a clock signal to one or more other components of MCU 502. MCU 502 may also include one or more portions of memory, such as a Random Access Memory (RAM) 508. In some embodiments, RAM 508 may store information generated and/or accessed by other components of MCU 502, such as a Central Processing Unit (CPU) 506. CPU 506 generally represents any type or form of microprocessor or similar device that carries out computer-executable instructions. In some examples, CPU 506 may be connected to and/or in communication with other components of MCU 502, as well as components of a visual display system and/or an artificial reality system that manages visual content provided to the user.

As shown in FIG. 5, CPU 506 may receive a control signal 516. In some embodiments, control signal 516 may indicate and/or control when LEDs 520(A)-520(C) are turned on. In these embodiments, CPU 506 may determine, based at least in part on the frequency and/or duty cycle of control signal 516, an appropriate amount of average power that should be provided to LEDs 520(A)-520(C) to ensure optimal operation of the LEDs. CPU 506 may then pass, to current driver 514, a control signal 522 that directs current driver 514 to provide an appropriate current level based on the appropriate amount of power.

In some examples, the duty cycle of control signal 522 may control (e.g., be proportional to) the current level output by current driver 514. In these examples, a PWM controller 510 of MCU 502 may select and/or adjust the duty cycle of control signal 522 based on control signal 516. For example, PWM controller 510 may receive, from CPU 506, input that indicates the duty cycle of control signal 516 and/or the appropriate amount of power to be provided to LEDs 520(A)-520(C). Based on this input, PWM controller 510 may execute an algorithm or set of instructions to determine the appropriate duty cycle for control signal 522. PWM controller 510 may then return this information to CPU 506.

In some examples, PWM controller 510 may represent and/or include a program, processor, and/or portion of logic incorporated into MCU 502.

As shown in FIG. 5, MCU 502 may also include an analog-to-digital converter (ADC) 512. ADC 512 represents and/or includes any software- and/or hardware-based circuit or device that processes and/or alters an analog signal (such as by converting the analog signal to a digital signal). In some examples, ADC 512 may monitor and/or process the headroom voltage (e.g., voltage drop) across one or more of LEDs 520(A)-520(C). In one example, ADC 512 may perform a zero-order hold on the headroom voltage of the LEDs. In some embodiments, a zero-order hold may include sampling the value of a signal and holding the value for a certain length of time before re-sampling the value of the signal.

FIG. 6 illustrates exemplary signals that may be input to and/or output by ADC 512. In this example, an ADC input 602 may correspond to the output voltage of LEDs 520(A)-520(C). In some examples, ADC 512 may receive and then perform a zero-order hold on ADC input 602. ADC 512 may perform the zero-order hold in a variety of ways. In one embodiment, ADC 512 may sample and hold ADC input 602 in accordance with an ADC sampling signal 604 shown in FIG. 6. In this embodiment, ADC 512 may sample ADC input 602 each time ADC sampling signal 604 goes high.

In some examples, ADC sampling signal 604 may be synced with control signal 516 in FIG. 5. Because control signal 516 controls when LEDs 520(A)-520(C) are turned on, the frequency of ADC sampling signal 604 may match and/or correspond to the frequency of ADC input 602. Thus, the output of ADC 512 may have a constant (or approximately constant) voltage level. ADC output 606 in FIG. 6 represents an exemplary output of the zero-order hold performed by ADC 512. As shown in FIG. 6, ADC output 606 may not include voltage fluctuations corresponding to a headroom voltage 608 within ADC input 602. Accordingly, ADC 512 may represent and/or act as a lowpass filter that filters and/or removes voltage fluctuations within ADC input 602.

In some embodiments, MCU 502 may direct the operation of current driver 514 based at least in part on ADC output 606. For example, ADC output 606 may represent and/or act as a negative feedback loop that indicates when the output voltage of LEDs 520(A)-520(C) has dropped. In traditional driver systems, a drop in the output voltage of a load may prompt an increase in the amount of power (e.g., the amount of voltage and/or current) provided to the load. However, because ADC output 606 may be constant or approximately constant, fluctuations within the output voltage may be invisible to and/or not detected by MCU 502. As such, MCU 502 may direct current driver 514 to provide a constant (or approximately constant) level of current to LEDs 520(A)-520(C).

In some examples, one or more components of apparatus 500 may be incorporated into an integrated circuit or chip. For example, MCU 502 and current driver 514 may be included within an integrated circuit that is coupled to power supply 518 and LEDs 520(A)-520(C). Apparatus 500 may also include any additional or alternative component not illustrated in FIG. 5. For example, apparatus 500 may include an over voltage protection circuit or device, any number or type of switches, and/or any number or type of current and/or voltage amplifiers.

FIG. 7 is a flow diagram of an exemplary method 700 for improving high-power drivers according to any of the embodiments disclosed herein. The steps shown in FIG. 7 may incorporate and/or involve various sub-steps and/or variations consistent with the descriptions described above in connection with FIGS. 1-6.

At step 710, a driver system may receive, from a visual display system, a control signal indicating one or more points in time that a light-emitting device is to illuminate a portion of a visual display. In one embodiment, the visual display may provide virtual reality, augmented reality, and/or artificial reality content to a user. In this embodiment, the visual display system may periodically update and/or refresh the content presented on the visual display. The control signal may indicate and/or correspond to points in time that the content is static and, therefore, ready to be illuminated by the light-emitting device.

At step 720, the driver system may determine, based at least in part on the control signal, a sufficient amount of power to provide to the light-emitting device to enable the light-emitting device to illuminate the portion of the visual display at the points in time. For example, a microcontroller within the driver system may calculate an amount of constant current to provide to the light-emitting device. This amount of constant current may provide the light-emitting device with enough average power to ensure optimal operation of the light-emitting device while the user interacts with the visual display.

At step 730, the driver system may direct a boost circuit to provide the sufficient amount of power to the light-emitting device. For example, the microcontroller within the driver system may send, to the boost circuit, a control signal that indicates the calculated amount of current to provide to the light-emitting device. In some embodiments, the PWM (e.g., duty cycle) of the control signal may be proportional to the amount of constant current to be provided by the boost circuit. In this way, the driver system may provide power whose AC components are negligible and/or under a certain threshold relative to the DC components.

As discussed above, the disclosed driver systems may provide various benefits and advantages compared to traditional (e.g., two-stage) drivers. For example, embodiments of the disclosed driver systems may be capable of outputting high levels of constant current and/or average power without incorporating large capacitors. Reducing the size and/or number of capacitors within a driver system may decrease both the cost and the size of an integrated circuit that includes the driver system. In addition, by eliminating and/or reducing reactive power from the total amount of power provided to a boost stage, the disclosed driver systems may improve the efficiency of power supplies used by the driver systems.

EXAMPLE EMBODIMENTS

Example 1

An apparatus may include (1) at least one light-emitting device, (2) a boost circuit electrically coupled to the light-emitting device, and (3) a microcontroller that (A) receives, from a visual display system, a control signal indicating one or more points in time that the light-emitting device is to illuminate a portion of a visual display and (B) directs, based at least in part on the control signal, the boost circuit to provide a sufficient amount of power to the light-emitting device to enable the light-emitting device to illuminate the portion of the visual display at the points in time.

Example 2

The apparatus of Example 1, wherein the sufficient amount of power comprises a certain amount of average power.

Example 3

The apparatus of Examples 1 or 2, wherein the sufficient amount of power includes a direct current component with a certain current level and an alternating current component whose current level is less than a threshold current level.

Example 4

The apparatus of any of Examples 1-3, wherein the microcontroller determines the sufficient amount of power for the boost circuit to provide to the light-emitting device based at least in part on a duty cycle of the control signal.

Example 5

The apparatus of any of Examples 1-4, wherein the microcontroller sends, to the boost circuit, an additional control signal that controls the amount of power provided to the light-emitting device by the boost circuit.

Example 6

The apparatus of Example 5, wherein the microcontroller sends, to the boost circuit, an additional control signal that controls the amount of power provided to the light-emitting device by the boost circuit.

Example 7

The apparatus of Example 6, wherein the additional control signal comprises a pulse wave with a variable pulse width.

Example 8

The apparatus of Example 7, wherein the microcontroller selects the pulse width of the additional control signal such that the boost circuit provides the sufficient amount of power to the light-emitting device.

Example 9

The apparatus of any of Examples 1-8, wherein the boost circuit comprises an analog-to-digital converter that samples and holds voltage fluctuations across the light-emitting device produced by the light-emitting device switching on and off.

Example 10

The apparatus of Example 9, wherein the microcontroller utilizes output of the analog-to-digital converter to at least partially prevent the voltage fluctuations from being introduced into the power provided to the light-emitting device.

Example 11

The apparatus of Example 9, wherein the microcontroller and the analog-to-digital converter are incorporated into an integrated circuit that is electrically coupled to the light-emitting device.

Example 12

The apparatus of any of Examples 1-11, wherein the apparatus comprises a single boost stage that includes the boost circuit.

Example 13

A system comprising (1) a visual display, (2) at least one light-emitting device that illuminates a portion of the visual display, and (3) an integrated circuit comprising (A) a boost stage electrically coupled to the light-emitting device and (B) a microcontroller that (i) receives, from the visual display, a control signal indicating points in time the light-emitting device is to illuminate the portion of the visual display and (ii) directs, based at least in part on the control signal, the boost stage to provide a sufficient amount of power to the light-emitting device to enable the light-emitting device to illuminate the portion of the visual display at the points in time.

Example 14

The system of Example 13, wherein the visual display comprises a liquid crystal display.

Example 15

The system of Example 14, wherein the liquid crystal display is incorporated into a headset that provides virtual content to a user of an artificial reality system.

Example 16

The system of any of Examples 13-15, wherein the boost stage is the only boost stage within the integrated circuit.

Example 17

The system of any of Examples 13-16, wherein the integrated circuit further comprises a pulse width modulation controller that adjusts a pulse width of an additional control signal sent to the boost stage from the microcontroller.

Example 18

The system of Example 17, wherein the pulse width of the additional control signal is proportional to the amount of power provided by the boost stage to the light-emitting device.

Example 19

The system of any of Examples 13-18, further comprising a constant current driver that facilitates providing, to the light-emitting device, power that includes a direct current component with a certain current level and an alternating current component whose current level is less than a threshold current level.

Example 20

A method comprising (1) receiving, from a visual display system, a control signal indicating one or more points in time that a light-emitting device is to illuminate a portion of a visual display, (2) determining, based at least in part on the control signal, a sufficient amount of power to provide to the light-emitting device to enable the light-emitting device to illuminate the portion of the visual display at the points in time, and (3) directing a boost circuit to provide the sufficient amount of power to the light-emitting device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Embodiments of the present disclosure may include or be implemented in conjunction with various types of artificial reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs), an example of which is augmented-reality system 800 in FIG. 8. Other artificial reality systems may include a NED that also provides visibility into the real world (e.g., augmented-reality system 900 in FIG. 9) or that visually immerses a user in an artificial reality (e.g., virtual-reality system 1000 in FIG. 10). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 8, augmented-reality system 800 generally represents a wearable device dimensioned to fit about a body part (e.g., a head) of a user. As shown in FIG. 8, system 800 may include a frame 802 and a camera assembly 804 that is coupled to frame 802 and configured to gather information about a local environment by observing the local environment. Augmented-reality system 800 may also include one or more audio devices, such as output audio transducers 808(A) and 808(B) and input audio transducers 810. Output audio transducers 808(A) and 808(B) may provide audio feedback and/or content to a user, and input audio transducers 810 may capture audio in a user's environment.

As shown, augmented-reality system 800 may not necessarily include a NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 800 may not include a NED, augmented-reality system 800 may include other types of screens or visual feedback devices (e.g., a display screen integrated into a side of frame 802).

The embodiments discussed in this disclosure may also be implemented in augmented-reality systems that include one or more NEDs. For example, as shown in FIG. 9, augmented-reality system 900 may include an eyewear device 902 with a frame 910 configured to hold a left display device 915(A) and a right display device 915(B) in front of a user's eyes. Display devices 915(A) and 915(B) may act together or independently to present an image or series of images to a user. While augmented-reality system 900 includes two displays, embodiments of this disclosure may be implemented in augmented-reality systems with a single NED or more than two NEDs.

In some embodiments, augmented-reality system 900 may include one or more sensors, such as sensor 940. Sensor 940 may generate measurement signals in response to motion of augmented-reality system 900 and may be located on substantially any portion of frame 910. Sensor 940 may represent a position sensor, an inertial measurement unit (IMU), a depth camera assembly, or any combination thereof. In some embodiments, augmented-reality system 900 may or may not include sensor 940 or may include more than one sensor. In embodiments in which sensor 940 includes an IMU, the IMU may generate calibration data based on measurement signals from sensor 940. Examples of sensor 940 may include, without limitation, accelerometers, gyroscopes, magnetometers, other suitable types of sensors that detect motion, sensors used for error correction of the IMU, or some combination thereof. Augmented-reality system 900 may also include a microphone array with a plurality of acoustic transducers 920(A)-920(J), referred to collectively as acoustic transducers 920. Acoustic transducers 920 may be transducers that detect air pressure variations induced by sound waves. Each acoustic transducer 920 may be configured to detect sound and convert the detected sound into an electronic format (e.g., an analog or digital format). The microphone array in FIG. 9 may include, for example, ten acoustic transducers: 920(A) and 920(B), which may be designed to be placed inside a corresponding ear of the user, acoustic transducers 920(C), 920(D), 920(E), 920(F), 920(G), and 920(H), which may be positioned at various locations on frame 910, and/or acoustic transducers 920(1) and 920(J), which may be positioned on a corresponding neckband 905.

In some embodiments, one or more of acoustic transducers 920(A)-(F) may be used as output transducers (e.g., speakers). For example, acoustic transducers 920(A) and/or 920(B) may be earbuds or any other suitable type of headphone or speaker.

The configuration of acoustic transducers 920 of the microphone array may vary. While augmented-reality system 900 is shown in FIG. 9 as having ten acoustic transducers 920, the number of acoustic transducers 920 may be greater or less than ten. In some embodiments, using higher numbers of acoustic transducers 920 may increase the amount of audio information collected and/or the sensitivity and accuracy of the audio information. In contrast, using a lower number of acoustic transducers 920 may decrease the computing power required by the controller 950 to process the collected audio information. In addition, the position of each acoustic transducer 920 of the microphone array may vary. For example, the position of an acoustic transducer 920 may include a defined position on the user, a defined coordinate on frame 910, an orientation associated with each acoustic transducer, or some combination thereof.

Acoustic transducers 920(A) and 920(B) may be positioned on different parts of the user's ear, such as behind the pinna or within the auricle or fossa. Or, there may be additional acoustic transducers on or surrounding the ear in addition to acoustic transducers 920 inside the ear canal. Having an acoustic transducer positioned next to an ear canal of a user may enable the microphone array to collect information on how sounds arrive at the ear canal. By positioning at least two of acoustic transducers 920 on either side of a user's head (e.g., as binaural microphones), augmented-reality device 900 may simulate binaural hearing and capture a 3D stereo sound field around about a user's head. In some embodiments, acoustic transducers 920(A) and 920(B) may be connected to augmented-reality system 900 via a wired connection 930, and in other embodiments, acoustic transducers 920(A) and 920(B) may be connected to augmented-reality system 900 via a wireless connection (e.g., a Bluetooth connection). In still other embodiments, acoustic transducers 920(A) and 920(B) may not be used at all in conjunction with augmented-reality system 900.

Acoustic transducers 920 on frame 910 may be positioned along the length of the temples, across the bridge, above or below display devices 915(A) and 915(B), or some combination thereof. Acoustic transducers 920 may be oriented such that the microphone array is able to detect sounds in a wide range of directions surrounding the user wearing the augmented-reality system 900. In some embodiments, an optimization process may be performed during manufacturing of augmented-reality system 900 to determine relative positioning of each acoustic transducer 920 in the microphone array.

In some examples, augmented-reality system 900 may include or be connected to an external device (e.g., a paired device), such as neckband 905. Neckband 905 generally represents any type or form of paired device. Thus, the following discussion of neckband 905 may also apply to various other paired devices, such as charging cases, smart watches, smart phones, wrist bands, other wearable devices, hand-held controllers, tablet computers, laptop computers and other external compute devices, etc.

As shown, neckband 905 may be coupled to eyewear device 902 via one or more connectors. The connectors may be wired or wireless and may include electrical and/or non-electrical (e.g., structural) components. In some cases, eyewear device 902 and neckband 905 may operate independently without any wired or wireless connection between them. While FIG. 9 illustrates the components of eyewear device 902 and neckband 905 in example locations on eyewear device 902 and neckband 905, the components may be located elsewhere and/or distributed differently on eyewear device 902 and/or neckband 905. In some embodiments, the components of eyewear device 902 and neckband 905 may be located on one or more additional peripheral devices paired with eyewear device 902, neckband 905, or some combination thereof. Furthermore, pairing external devices, such as neckband 905, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 900 may be provided by a paired device or shared between a paired device and an eyewear device, thus reducing the weight, heat profile, and form factor of the eyewear device overall while still retaining desired functionality. For example, neckband 905 may allow components that would otherwise be included on an eyewear device to be included in neckband 905 since users may tolerate a heavier weight load on their shoulders than they would tolerate on their heads. Neckband 905 may also have a larger surface area over which to diffuse and disperse heat to the ambient environment. Thus, neckband 905 may allow for greater battery and computation capacity than might otherwise have been possible on a stand-alone eyewear device. Since weight carried in neckband 905 may be less invasive to a user than weight carried in eyewear device 902, a user may tolerate wearing a lighter eyewear device and carrying or wearing the paired device for greater lengths of time than a user would tolerate wearing a heavy standalone eyewear device, thereby enabling users to more fully incorporate artificial reality environments into their day-to-day activities.

Neckband 905 may be communicatively coupled with eyewear device 902 and/or to other devices. These other devices may provide certain functions (e.g., tracking, localizing, depth mapping, processing, storage, etc.) to augmented-reality system 900. In the embodiment of FIG. 9, neckband 905 may include two acoustic transducers (e.g., 920(1) and 920(J)) that are part of the microphone array (or potentially form their own microphone subarray). Neckband 905 may also include a controller 925 and a power source 935.

Acoustic transducers 920(1) and 920(J) of neckband 905 may be configured to detect sound and convert the detected sound into an electronic format (analog or digital). In the embodiment of FIG. 9, acoustic transducers 920(1) and 920(J) may be positioned on neckband 905, thereby increasing the distance between the neckband acoustic transducers 920(1) and 920(J) and other acoustic transducers 920 positioned on eyewear device 902. In some cases, increasing the distance between acoustic transducers 920 of the microphone array may improve the accuracy of beamforming performed via the microphone array. For example, if a sound is detected by acoustic transducers 920(C) and 920(D) and the distance between acoustic transducers 920(C) and 920(D) is greater than, e.g., the distance between acoustic transducers 920(D) and 920(E), the determined source location of the detected sound may be more accurate than if the sound had been detected by acoustic transducers 920(D) and 920(E).

Controller 925 of neckband 905 may process information generated by the sensors on 905 and/or augmented-reality system 900. For example, controller 925 may process information from the microphone array that describes sounds detected by the microphone array. For each detected sound, controller 925 may perform a direction-of-arrival (DOA) estimation to estimate a direction from which the detected sound arrived at the microphone array. As the microphone array detects sounds, controller 925 may populate an audio data set with the information. In embodiments in which augmented-reality system 900 includes an inertial measurement unit, controller 925 may compute all inertial and spatial calculations from the IMU located on eyewear device 902. A connector may convey information between augmented-reality system 900 and neckband 905 and between augmented-reality system 900 and controller 925. The information may be in the form of optical data, electrical data, wireless data, or any other transmittable data form. Moving the processing of information generated by augmented-reality system 900 to neckband 905 may reduce weight and heat in eyewear device 902, making it more comfortable to the user.

Power source 935 in neckband 905 may provide power to eyewear device 902 and/or to neckband 905. Power source 935 may include, without limitation, lithium ion batteries, lithium-polymer batteries, primary lithium batteries, alkaline batteries, or any other form of power storage. In some cases, power source 935 may be a wired power source. Including power source 935 on neckband 905 instead of on eyewear device 902 may help better distribute the weight and heat generated by power source 935.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 1000 in FIG. 10, that mostly or completely covers a user's field of view. Virtual-reality system 1000 may include a front rigid body 1002 and a band 1004 shaped to fit around a user's head. Virtual-reality system 1000 may also include output audio transducers 1006(A) and 1006(B). Furthermore, while not shown in FIG. 10, front rigid body 1002 may include one or more electronic elements, including one or more electronic displays, one or more inertial measurement units (IMUs), one or more tracking emitters or detectors, and/or any other suitable device or system for creating an artificial reality experience.

Artificial reality systems may include a variety of types of visual feedback mechanisms. For example, display devices in augmented-reality system 1000 and/or virtual-reality system 1000 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in augmented-reality system 200 and/or virtual-reality system 1000 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, augmented-reality system 100, augmented-reality system 200, and/or virtual-reality system 1000 may include one or more optical sensors, such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 8 and 10, output audio transducers 808(A), 808(B), 1006(A), and 1006(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 810 may include condenser microphones, dynamic microphones, ribbon microphones, and/or any other type or form of input transducer. In some embodiments, a single transducer may be used for both audio input and audio output.

While not shown in FIGS. 8-10, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

As noted, artificial reality systems 800, 900, and 1000 may be used with a variety of other types of devices to provide a more compelling artificial reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 11 illustrates a vibrotactile system 1100 in the form of a wearable glove (haptic device 1110) and wristband (haptic device 1120). Haptic device 1110 and haptic device 1120 are shown as examples of wearable devices that include a flexible, wearable textile material 1130 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1140 may be positioned at least partially within one or more corresponding pockets formed in textile material 1130 of vibrotactile system 1100. Vibrotactile devices 1140 may be positioned in locations to provide a vibrating sensation (e.g., haptic feedback) to a user of vibrotactile system 1100. For example, vibrotactile devices 1140 may be positioned to be against the user's finger(s), thumb, or wrist, as shown in FIG. 11. Vibrotactile devices 1140 may, in some examples, be sufficiently flexible to conform to or bend with the user's corresponding body part(s).

A power source 1150 (e.g., a battery) for applying a voltage to the vibrotactile devices 1140 for activation thereof may be electrically coupled to vibrotactile devices 1140, such as via conductive wiring 1152. In some examples, each of vibrotactile devices 1140 may be independently electrically coupled to power source 1150 for individual activation. In some embodiments, a processor 1160 may be operatively coupled to power source 1150 and configured (e.g., programmed) to control activation of vibrotactile devices 1140.

Vibrotactile system 1100 may be implemented in a variety of ways. In some examples, vibrotactile system 1100 may be a standalone system with integral subsystems and components for operation independent of other devices and systems. As another example, vibrotactile system 1100 may be configured for interaction with another device or system 1170. For example, vibrotactile system 1100 may, in some examples, include a communications interface 1180 for receiving and/or sending signals to the other device or system 1170. The other device or system 1170 may be a mobile device, a gaming console, an artificial reality (e.g., virtual reality, augmented reality, mixed reality) device, a personal computer, a tablet computer, a network device (e.g., a modem, a router, etc.), a handheld controller, etc. Communications interface 1180 may enable communications between vibrotactile system 1100 and the other device or system 1170 via a wireless (e.g., Wi-Fi, Bluetooth, cellular, radio, etc.) link or a wired link. If present, communications interface 1180 may be in communication with processor 1160, such as to provide a signal to processor 1160 to activate or deactivate one or more of the vibrotactile devices 1140.

Vibrotactile system 1100 may optionally include other subsystems and components, such as touch-sensitive pads 1190, pressure sensors, motion sensors, position sensors, lighting elements, and/or user interface elements (e.g., an on/off button, a vibration control element, etc.). During use, vibrotactile devices 1140 may be configured to be activated for a variety of different reasons, such as in response to the user's interaction with user interface elements, a signal from the motion or position sensors, a signal from the touch-sensitive pads 1190, a signal from the pressure sensors, a signal from the other device or system 1170, etc.

Although power source 1150, processor 1160, and communications interface 1180 are illustrated in FIG. 11 as being positioned in haptic device 1120, the present disclosure is not so limited. For example, one or more of power source 1150, processor 1160, or communications interface 1180 may be positioned within haptic device 1110 or within another wearable textile.

Haptic wearables, such as those shown in and described in connection with FIG. 11, may be implemented in a variety of types of artificial-reality systems and environments. FIG. 12 shows an example artificial reality environment 1200 including one head-mounted virtual-reality display and two haptic devices (i.e., gloves), and in other embodiments any number and/or combination of these components and other components may be included in an artificial reality system. For example, in some embodiments there may be multiple head-mounted displays each having an associated haptic device, with each head-mounted display and each haptic device communicating with the same console, portable computing device, or other computing system.

Head-mounted display 1202 generally represents any type or form of virtual-reality system, such as virtual-reality system 1000 in FIG. 10. Haptic device 1204 generally represents any type or form of wearable device, worn by a use of an artificial reality system, that provides haptic feedback to the user to give the user the perception that he or she is physically engaging with a virtual object. In some embodiments, haptic device 1204 may provide haptic feedback by applying vibration, motion, and/or force to the user. For example, haptic device 1204 may limit or augment a user's movement. To give a specific example, haptic device 1204 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use haptic device 1204 to send action requests to a console. Examples of action requests include, without limitation, requests to start an application and/or end the application and/or requests to perform a particular action within the application.

While haptic interfaces may be used with virtual-reality systems, as shown in FIG. 12, haptic interfaces may also be used with augmented-reality systems, as shown in FIG. 13. FIG. 13 is a perspective view a user 1310 interacting with an augmented-reality system 1300. In this example, user 1310 may wear a pair of augmented-reality glasses 1320 that have one or more displays 1322 and that are paired with a haptic device 1330. Haptic device 1330 may be a wristband that includes a plurality of band elements 1332 and a tensioning mechanism 1334 that connects band elements 1332 to one another.

One or more of band elements 1332 may include any type or form of actuator suitable for providing haptic feedback. For example, one or more of band elements 1332 may be configured to provide one or more of various types of cutaneous feedback, including vibration, force, traction, texture, and/or temperature. To provide such feedback, band elements 1332 may include one or more of various types of actuators. In one example, each of band elements 1332 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1110, 1120, 1204, and 1330 may include any suitable number and/or type of haptic transducer, sensor, and/or feedback mechanism. For example, haptic devices 1110, 1120, 1204, and 1330 may include one or more mechanical transducers, piezoelectric transducers, and/or fluidic transducers. Haptic devices 1110, 1120, 1204, and 1330 may also include various combinations of different types and forms of transducers that work together or independently to enhance a user's artificial-reality experience. In one example, each of band elements 1332 of haptic device 1330 may include a vibrotactor (e.g., a vibrotactile actuator) configured to vibrate in unison or independently to provide one or more of various types of haptic sensations to a user.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

The invention claimed is:

1. An apparatus comprising:
   at least one light-emitting device;
   a boost circuit electrically coupled to the light-emitting device; and
   a microcontroller that:
      receives, from a processing device of a visual display system, a control signal indicating one or more points in time that the light-emitting device is to illuminate a portion of a visual display;
      determines a sufficient amount of average power for the boost circuit to provide to the light-emitting device based at least in part on a duty cycle of the control signal; and
      directs, based at least in part on the control signal, the boost circuit to provide the sufficient amount of average power to the light-emitting device to enable the light-emitting device to illuminate the portion of the visual display at the points in time.

2. The apparatus of claim 1, wherein the sufficient amount of average power includes:
   a direct current component with a certain current level; and
   an alternating current component whose current level is less than a threshold current level.

3. The apparatus of claim 1, wherein the microcontroller sends, to the boost circuit, an additional control signal that controls the amount of power provided to the light-emitting device by the boost circuit.

4. The apparatus of claim 3, wherein the additional control signal comprises a pulse wave with a variable pulse width.

5. The apparatus of claim 4, wherein the pulse width of the additional control signal is proportional to the amount of power provided to the light-emitting device by the boost circuit.

6. The apparatus of claim 5, wherein the microcontroller selects the pulse width of the additional control signal such that the boost circuit provides the sufficient amount of average power to the light-emitting device.

7. The apparatus of claim 1, wherein the boost circuit comprises an analog-to-digital converter that samples and holds voltage fluctuations across the light-emitting device produced by the light-emitting device switching on and off.

8. The apparatus of claim 7, wherein the microcontroller utilizes output of the analog-to-digital converter to at least partially prevent the voltage fluctuations from being introduced into the power provided to the light-emitting device.

9. The apparatus of claim 7, wherein the microcontroller and the analog-to-digital converter are incorporated into an integrated circuit that is electrically coupled to the light-emitting device.

10. The apparatus of claim 1, wherein the apparatus comprises a single boosting stage that includes the boost circuit.

11. A system comprising:
    a visual display;
    at least one light-emitting device that illuminates a portion of the visual display; and
    an integrated circuit comprising:
       a boost stage electrically coupled to the light-emitting device; and
       a microcontroller that:
          receives, from a processing device of the visual display, a control signal indicating points in time the light-emitting device is to illuminate the portion of the visual display;
          determines a sufficient amount of average power for the boost stage to provide to the light-emitting device based at least in part on a duty cycle of the control signal; and
          directs, based at least in part on the control signal, the boost stage to provide the sufficient amount of average power to the light-emitting device to enable the light-emitting device to illuminate the portion of the visual display at the points in time.

12. The system of claim 11, wherein the visual display comprises a liquid crystal display.

13. The system of claim 12, wherein the liquid crystal display is incorporated into a headset that provides virtual content to a user of an artificial reality system.

14. The system of claim 11, wherein the boost stage is the only boost stage within the integrated circuit.

15. The system of claim 11, wherein the integrated circuit further comprises a pulse width modulation controller that adjusts a pulse width of an additional control signal sent to the boost stage from the microcontroller.

16. The system of claim 15, wherein the pulse width of the additional control signal is proportional to the amount of power provided by the boost stage to the light-emitting device.

17. The system of claim 11, further comprising a constant current driver that facilitates providing, to the light-emitting device, power that includes:
- a direct current component with a certain current level; and
- an alternating current component whose current level is less than a threshold current level.

18. A method comprising:
- receiving, from a processing device of a visual display system, a control signal indicating one or more points in time that a light-emitting device is to illuminate a portion of a visual display;
- determining a duty cycle of the control signal received from the processing device of the visual display system;
- determining, based at least in part on the duty cycle of the control signal, a sufficient amount of average power to provide to the light-emitting device to enable the light-emitting device to illuminate the portion of the visual display at the points in time; and
- directing a boost circuit to provide the sufficient amount of average power to the light-emitting device.

\* \* \* \* \*